US009752890B2

(12) United States Patent
Meisels et al.

(10) Patent No.: US 9,752,890 B2
(45) Date of Patent: *Sep. 5, 2017

(54) IDENTIFYING A RESULT RESPONSIVE TO A CURRENT LOCATION OF A CLIENT DEVICE

(75) Inventors: Adrienne C. Meisels, New York, NY (US); Stephen J. Coughlin, Falls Church, VA (US); George Fletcher, Round Hill, VA (US); David S. Bill, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/791,165

(22) Filed: Jun. 1, 2010

(65) Prior Publication Data
US 2010/0241351 A1    Sep. 23, 2010

Related U.S. Application Data

(63) Continuation of application No. 11/618,348, filed on Dec. 29, 2006, now Pat. No. 7,743,056.

(60) Provisional application No. 60/747,746, filed on May 19, 2006, provisional application No. 60/789,910, (Continued)

(51) Int. Cl.
*G06F 17/30* (2006.01)
*G01C 21/36* (2006.01)
*G01C 21/34* (2006.01)
*G01C 21/10* (2006.01)

(52) U.S. Cl.
CPC ......... *G01C 21/3682* (2013.01); *G01C 21/10* (2013.01); *G01C 21/3476* (2013.01); *G01C 21/3492* (2013.01); *G01C 21/3667* (2013.01); *G01C 21/3679* (2013.01); *G06F 17/3087* (2013.01); *G06F 17/30241* (2013.01)

(58) Field of Classification Search
CPC ......... G06F 17/30864; G06F 17/30867; G06F 17/30241; G06F 17/3087; G01C 21/3679
USPC .......................... 707/737, 731, 771; 701/400
See application file for complete search history.

(56) References Cited

U.S. PATENT DOCUMENTS

| 4,301,506 A | 11/1981 | Turco |
| 4,393,448 A | 7/1983 | Dunn et al. |
| 4,413,322 A | 11/1983 | Foster et al. |

(Continued)

FOREIGN PATENT DOCUMENTS

WO    WO 03107129 A2    12/2003

OTHER PUBLICATIONS

"MapQuest Help: What is Turn-by-Turn Navigation?," reprinted from http://help.mapquest.com/jive/entry.jspa? externalID=298 &categoryIDS=35 on Jul. 26, 2007, 1 page.

(Continued)

*Primary Examiner* — Cam-Y Truong
(74) *Attorney, Agent, or Firm* — Keller Jolley Preece

(57) ABSTRACT

A method for identifying a result responsive to a current location of a client device includes receiving, form a client device and at a host, a search query that includes a point of interest and a current location of the client device. The method also includes automatically updating the search query as the current location of the client device changes and instructing the host to identify a potential location associated with the point of interest and located within a user-defined proximity from the current location of the client device.

21 Claims, 4 Drawing Sheets

Related U.S. Application Data filed on Apr. 7, 2006, provisional application No. 60/787,690, filed on Mar. 31, 2006.

(56) References Cited

U.S. PATENT DOCUMENTS

| | | | |
|---|---|---|---|
| 4,528,552 A | 7/1985 | Moriyama et al. | |
| 4,546,439 A | 10/1985 | Gene | |
| 4,570,227 A | 2/1986 | Tachi et al. | |
| 4,646,089 A | 2/1987 | Takanabe et al. | |
| 4,689,747 A | 8/1987 | Kurose et al. | |
| 4,796,189 A | 1/1989 | Nakayama et al. | |
| 4,827,419 A | 5/1989 | Selby | |
| 4,866,626 A | 9/1989 | Egli | |
| 4,876,651 A | 10/1989 | Dawson et al. | |
| 4,890,104 A | 12/1989 | Takanabe et al. | |
| 4,914,605 A | 4/1990 | Loughmiller et al. | |
| 4,926,336 A | 5/1990 | Yamada | |
| 4,937,753 A | 6/1990 | Yamada | |
| 4,954,958 A | 9/1990 | Savage et al. | |
| 4,962,458 A | 10/1990 | Verstraete | |
| 4,984,168 A | 1/1991 | Neukrichner et al. | |
| 5,031,104 A | 7/1991 | Ikeda et al. | |
| 5,041,983 A | 8/1991 | Nakahara et al. | |
| 5,067,081 A | 11/1991 | Person | |
| 5,115,399 A | 5/1992 | Nimura et al. | |
| 5,121,326 A | 6/1992 | Moroto et al. | |
| 5,168,452 A | 12/1992 | Yamada et al. | |
| 5,170,353 A | 12/1992 | Verstraete | |
| 5,172,321 A | 12/1992 | Ghaem et al. | |
| 5,189,430 A | 2/1993 | Yano et al. | |
| 5,191,406 A | 3/1993 | Brandestini et al. | |
| 5,191,532 A | 3/1993 | Moroto et al. | |
| 5,231,584 A | 7/1993 | Nimura et al. | |
| 5,270,937 A | 12/1993 | Link et al. | |
| 5,272,638 A | 12/1993 | Martin et al. | |
| 5,274,387 A | 12/1993 | Kakihara et al. | |
| 5,293,163 A | 3/1994 | Kakihara et al. | |
| 5,353,034 A | 10/1994 | Sato et al. | |
| 5,442,557 A | 8/1995 | Kaneko | |
| 5,486,822 A | 1/1996 | Tenmoku et al. | |
| 5,557,524 A | 9/1996 | Maki | |
| 5,608,635 A | 3/1997 | Tamai | |
| 5,732,385 A | 3/1998 | Nakayama et al. | |
| 5,790,974 A | 8/1998 | Tognazzini | |
| 6,052,563 A | 4/2000 | Macko | |
| 6,144,920 A | 11/2000 | Mikame | |
| 6,282,489 B1 | 8/2001 | Bellesfield et al. | |
| 6,292,666 B1 | 9/2001 | Siddiqui et al. | |
| 6,401,034 B1* | 6/2002 | Kaplan et al. | 701/209 |
| 6,498,982 B2 | 12/2002 | Bellesfield et al. | |
| 6,526,349 B2 | 2/2003 | Bullock et al. | |
| 6,529,136 B2 | 3/2003 | Cao et al. | |
| 6,529,159 B1* | 3/2003 | Fan | G01S 5/0027 342/357.64 |
| 6,609,064 B1 | 8/2003 | Dean | |
| 6,678,613 B2 | 1/2004 | Andrews et al. | |
| 6,741,188 B1 | 5/2004 | Miller et al. | |
| 6,801,139 B2 | 10/2004 | Tretyak | |
| 6,842,696 B2 | 1/2005 | Silvester | |
| 6,895,329 B1 | 5/2005 | Wolfson | |
| 6,920,384 B2* | 7/2005 | Shiimado et al. | 701/65 |
| 6,944,539 B2 | 9/2005 | Yamada et al. | |
| 6,958,692 B1 | 10/2005 | Ratschunas | |
| 6,993,430 B1 | 1/2006 | Bellesfield et al. | |
| 7,062,374 B1 | 6/2006 | Walters et al. | |
| 7,085,649 B2 | 8/2006 | Baur et al. | |
| 7,139,722 B2 | 11/2006 | Perrella et al. | |
| 7,188,026 B2* | 3/2007 | Tzamaloukas | 701/522 |
| 7,313,767 B2 | 12/2007 | Mak | |
| 7,373,244 B2 | 5/2008 | Kreft | |
| 7,552,009 B2 | 6/2009 | Nelson | |
| 7,743,056 B2 | 6/2010 | Meisels et al. | |
| 7,869,941 B2 | 1/2011 | Coughlin et al. | |
| 7,925,525 B2 | 4/2011 | Chin | |
| 7,941,753 B2 | 5/2011 | Meisels et al. | |
| 8,073,614 B2 | 12/2011 | Coughlin et al. | |
| 2002/0019835 A1 | 2/2002 | Baur et al. | |
| 2002/0052674 A1* | 5/2002 | Chang | G06F 17/3087 700/300 |
| 2002/0062236 A1 | 5/2002 | Murashita et al. | |
| 2002/0188603 A1 | 12/2002 | Baird et al. | |
| 2003/0001779 A1 | 1/2003 | Mintz et al. | |
| 2003/0004776 A1 | 1/2003 | Perrella et al. | |
| 2003/0036848 A1* | 2/2003 | Sheha et al. | 701/209 |
| 2003/0163253 A1* | 8/2003 | Lee | G01C 21/3415 701/446 |
| 2003/0191578 A1 | 10/2003 | Paulauskas et al. | |
| 2003/0217073 A1 | 11/2003 | Walther et al. | |
| 2004/0158392 A1 | 8/2004 | Choi | |
| 2004/0260465 A1* | 12/2004 | Tu | 701/209 |
| 2005/0015316 A1 | 1/2005 | Salluzzo | |
| 2005/0027705 A1* | 2/2005 | Sadri et al. | 707/5 |
| 2005/0055353 A1 | 3/2005 | Marx et al. | |
| 2005/0075119 A1* | 4/2005 | Sheha et al. | 455/456.6 |
| 2005/0096841 A1 | 5/2005 | Gedik et al. | |
| 2005/0096946 A1 | 5/2005 | Janakiraman et al. | |
| 2005/0119927 A1 | 6/2005 | Patel | |
| 2005/0165631 A1 | 7/2005 | Horvitz | |
| 2005/0221808 A1 | 10/2005 | Karlsson et al. | |
| 2005/0227712 A1 | 10/2005 | Estevez et al. | |
| 2005/0228860 A1* | 10/2005 | Hamynen et al. | 709/203 |
| 2005/0278114 A1* | 12/2005 | Ahmad | G06F 17/30595 701/431 |
| 2006/0047644 A1* | 3/2006 | Bocking et al. | 707/4 |
| 2006/0058952 A1 | 3/2006 | Cooper et al. | |
| 2006/0218029 A1 | 9/2006 | Chin | |
| 2007/0106458 A1* | 5/2007 | Iwami et al. | 701/201 |
| 2007/0112780 A1* | 5/2007 | Stone | H04L 67/22 |
| 2008/0054072 A1* | 3/2008 | Katragadda et al. | 235/384 |
| 2008/0059890 A1 | 3/2008 | Zinn et al. | |
| 2008/0167938 A1 | 7/2008 | Meisels et al. | |
| 2011/0070872 A1 | 3/2011 | Ellanti et al. | |
| 2011/0257881 A1 | 10/2011 | Chen et al. | |
| 2014/0114571 A1 | 4/2014 | Coughlin et al. | |
| 2016/0142882 A1 | 5/2016 | Coughlin et al. | |

OTHER PUBLICATIONS

"Mobile Web Hop Online Anywhere on your Phone," reprinted from http://mobile.yahoo.com/mobileweb;_ylt=AvZP2FpcYsq1R9iZxOpUlUnntAcJ on Jul. 26, 2007, 3 pages.

"Yahoo! GO 2.0 Improved! The Internet to Go," reprinted from http://mobile.yahoo.com/go;_ylt=AqcFZ_48Qo6sCBg9mCOe6YktQcJ, on Jul. 26, 2007, 6 pages.

"Yahoo! Mobile. The Internet Now Fits Your Phone," reprinted from heep://mobile.yahoo.com/;_ylt=AujFWTXXwBsSTR8Hk_P52L1bztAcJ on Jul. 26, 2007, 2 pages Guzolek, J., and Koch, E., "Real-time Route Planning in Road Networks," 1989 IEEE, pp. 165-169.

Pruitt, Scarlet, "MapQuest Goes Mobile," PC World, reprinted from http://www.pcworld.com/article/id,119161-page,1/article.html on Jul. 26, 2007, 3 pages.

Sherman, Chris, "Search Engine Watch: Google Launches Local for Mobile," reprinted on Sep. 11, 2006 from http://searchenginewatch.com/showPage.html?page=sew_print&id=3561956.

Singh, Bhagat, and Naps, Thomas L., Introduction to Data Structures, "The Shortest Path Algorithm," West Publishing Company, 1985, pp. 215-223.

Snyder, John P., "Map Projections—A Working Manual"; U.S. Geological Survey Professional Paper; 1987; U.S. Department of Interior, 383 pages.

U.S. Appl. No. 13/296,130, filed Nov. 14, 2011. Coughlin et al.
U.S. Appl. No. 13/620,529, filed Sep. 14, 2012, Coughlin et al.
U.S. Appl. No. 13/620,525, filed Sep. 14, 2012, Coughlin et al.
U.S. Appl. No. 13/620,523, filed Sep. 14, 2012, Coughlin et al.
U.S. Appl. No. 13/520,520, filed Sep. 14, 2012, Coughlin et al.
U.S. Appl. No. 13/620,513, filed Sep. 14, 2012, Meisels et al.
U.S. Appl. No. 13/620,516, filed Sep. 14, 2012, Meisels et al.
U.S. Appl. No. 13/620,536, filed Sep. 14, 2012, Meisels et al.
U.S. Appl. No. 13/620,533, filed Sep. 14, 2012, Meisels et al.

(56) References Cited

OTHER PUBLICATIONS

Sherman, C., "Google Launches Local for Mobile," SearchEngineWatch, reprinted from http://searchenginewatch.com/showPage.html?page=3561956 on Aug. 23, 2012, 4 pages.
U.S. Appl. No. 11/618,069, Jul. 22, 2009, Office Action.
U.S. Appl. No. 11/618,069, Jul. 9, 2010, Office Action.
U.S. Appl. No. 11/618,069, Jan. 5, 2011, Notice of Allowance.
U.S. Appl. No. 11/966,562, Apr. 9, 2010, Office Action.
U.S. Appl. No. 11/966,562, Sep. 7, 2010, Notice of Allowance.
U.S. Appl. No. 12/962,357, Jan. 25, 2011, Office Action.
U.S. Appl. No. 12/962,357, Jul. 26, 2011, Notice of Allowance.
U.S. Appl. No. 12/296,130, Feb. 6, 2012, Office Action.
U.S. Appl. No. 12/296,130, May 24, 2012, Notice of Allowance.
U.S. Appl. No. 11/618,348, Jun. 3, 2008, Office Action.
U.S. Appl. No. 11/618,348, Nov. 13, 2008, Office Action.
U.S. Appl. No. 11/618,348, Apr. 14, 2009, Office Action.
U.S. Appl. No. 11/618,348, Sep. 23, 2009, Office Action.
U.S. Appl. No. 11/618,348, Feb. 8, 2010, Notice of Allowance.
U.S. Appl. No. 11/966,639, Oct. 7, 2010, Office Action.
U.S. Appl. No. 11/966,639, Mar. 16, 2011, Office Action.
U.S. Appl. No. 11/966,639, Aug. 17, 2011, Office Action.
U.S. Appl. No. 11/966,639, Feb. 1, 2012, Office Action.
Singh, Bhagat, and Naps, Thomas L., Introduction to Data Structures, "The Shortest Path Algorithm," West Publishing Company, 1985, pp. 215-233.
European Office Action in App. No. 07866078.4-1955 dated Oct. 2, 2013.
U.S. Appl. No. 11/966,639, Jan. 22, 2014, Notice of Allowance.
U.S. Appl. No. 13/296,130, Sep. 25, 2012, Notice of Allowance.
U.S. Appl. No. 13/620,513, Apr. 10, 2013, Office Action.
U.S. Appl. No. 13/620,513, Jul. 25, 2013, Office Action.
U.S. Appl. No. 13/620,513, Nov. 29, 2013, Office Action.
U.S. Appl. No. 13/620,513, Apr. 28, 2014, Office Action.
U.S. Appl. No. 13/620,516, Apr. 10, 2013, Office Action.
U.S. Appl. No. 13/620,520, Jan. 28, 2013, Office Action.
U.S. Appl. No. 13/620,520, Jun. 24, 2013, Notice of Allowance.
U.S. Appl. No. 13/620,520, Jul. 19, 2013, Notice of Allowance.
U.S. Appl. No. 13/620,523, Jan. 29, 2013, Office Action.
U.S. Appl. No. 13/620,523, Jun. 20, 2013, Notice of Allowance.
U.S. Appl. No. 13/620,525, Jan. 29, 2013, Office Action.
U.S. Appl. No. 13/620,525, Jun. 24, 2013, Notice of Allowance.
U.S. Appl. No. 13/620,525, Jul. 22, 2013, Notice of Allowance.
U.S. Appl. No. 13/620,529, Jan. 29, 2013, Office Action.
U.S. Appl. No. 13/620,529, May 24, 2013, Notice of Allowance.
U.S. Appl. No. 13/620,529, Jun. 14, 2013, Notice of Allowance.
U.S. Appl. No. 13/620,533, Dec. 20, 2012, Office Action.
U.S. Appl. No. 13/620,536, Dec. 20, 2012, Office Action.
U.S. Appl. No. 13/620,536, Aug. 23, 2013, Office Action.
Canadian Office Action in App. No. 2674031 dated Sep. 23, 2014 (4 pgs).
U.S. Appl. No. 13/620,513, Aug. 13, 2014, Office Action.
U.S. Appl. No. 14/054,349, Nov. 6, 2014, Office Action.
U.S. Appl. No. 14/927,177, filed Oct. 29, 2015, Meisels et al.
U.S. Appl. No. 13/620,513, Jul. 7, 2015, Notice of Allowance.
U.S. Appl. No. 13/620,513, Sep. 3, 2015, Notice of Allowance.
U.S. Appl. No. 14/054,349, Apr. 2, 2015, Office Action.
U.S. Appl. No. 14/054,349, Sep. 18, 2015, Notice of Allowance.
U.S. Appl. No. 14/927,177, Aug. 11, 2016, Office Action.
U.S. Appl. No. 14/927,177, Feb. 3, 2017, Notice of Allowance.
U.S. Appl. No. 15/006,079, Apr. 19, 2017, Office Action.
Guzolek, J., and Koch, E., "Real-time Route Planning in Road Networks," 1989 IEEE, pp. 165-169.
International Search Report and Written Opinion for International Application No. PCT/US07/89039, dated Apr. 23, 2008, 16 pages.
International Search Report and Written Opinion for International Application No. PCT/US07/65714, dated Jun. 20, 2008, 17 pages.
Notice of Allowance dated Aug. 10, 2005; U.S. Appl. No. 10/273,889; 4 pages.
Office Action dated Apr. 16, 2004; U.S. Appl. No. 10/273,889; 7 pages.
Office Action dated Dec. 19, 2006; U.S. Appl. No. 11/328,455; 9 pages.
Office Action dated Jan. 24, 2005; U.S. Appl. No. 10/273,889; 8 pages.
Office Action dated Jun. 26, 2007; U.S. Appl. No. 11/328,455; 7 pages.
Office Action dated Sep. 10, 2003; U.S. Appl. No. 10/273,889; 6 pages.
Office Action dated Dec. 31, 2008; U.S. Appl. No. 11/618,069; 29 pages.
Office Action dated Jan. 5, 2010; U.S. Appl. No. 11/618,069; 17 pages.

\* cited by examiner

IDENTIFYING A RESULT RESPONSIVE TO A CURRENT LOCATION OF A CLIENT DEVICE

CROSS REFERENCE TO RELATED APPLICATIONS

The present application is a continuation of U.S. patent application Ser. No. 11/618,348, filed Dec. 29, 2006, which claims priority from U.S. Provisional Application No. 60/789,910, filed Apr. 7, 2006, U.S. Provisional Application No. 60/787,690, filed Mar. 31, 2006, and U.S. Provisional Application No. 60/747,746, filed May 19, 2006. The contents of the prior applications are incorporated herein by reference in their entirety.

TECHNICAL FIELD

This document relates to identifying a result responsive to a current location of a client device.

BACKGROUND

A common use of the Internet involves accessing at leverage search engines to retrieve information responsive to user-designated query terms. For example, a user may access a search engine and request information related to a particular service of interest, such as a movie theater.

SUMMARY

In one general aspect a method for identifying a result responsive to a current location of a client device includes receiving, from a client device and at a host, a search query that includes a point of interest and a location corresponding to a current location of the client device, accessing user-defined information that relates to a travel distance or travel time, and determining the travel distance or the travel time based on the accessed user-defined information. The method also includes referencing a travel objective. The travel objective includes instructions for processing the location corresponding to the current location of the client device received with the search query, the travel distance or the travel time determined based on the accessed user-defined information, and the point of interest received with the search query to identify at least one potential location based on a relationship between the potential location and the point of interest and based on a determination that the potential location and the location of the client device received with the search query are located within the travel distance or accessible within the travel time determined based on the accessed user-defined information. The method also includes identifying a search result by applying the travel objective to the location corresponding to the current location of the client device.

The method further includes automatically receiving, from the client device, a new location of the client device as the location of the client device changes, comparing the new location to the location received with the search query to determine whether the new location of the client device differs by more than a threshold amount from the location received with the search query, and determining whether the new location of the client device differs by more than the threshold amount from the location received with the search query. If it is determined the new location of the client device differs by more than the threshold amount from the location received with the search query, the method includes updating the search result to include at least one potential location located within the travel distance or accessible within the travel time from the new location of the client device.

Implementations of the above general aspect may include one or more of the following features. For example, the location corresponding to the current location of the client device may include an actual position of the client device. Alternatively or additionally, the location corresponding to the current location of the client device may include a location that is used as a surrogate for the current location of the client device. The location used as the surrogate may include a location of a base station or an access point that the client device uses for communication. The location of the base station or the access point may indicate a proximate current location of the client device. The base station may include a cellular base station and the client device may include a mobile phone.

Automatically receiving the new location of the client device may include automatically receiving, from the client device, the new location as a part of an updated search query as the location of the client device changes. Alternatively or additionally, automatically receiving the new location of the client device may include periodically receiving, from the client device, location information associated with the client device irrespective of whether the current location of the client device has changed. Alternatively or additionally, automatically receiving the new location may include receiving, from the client device and without an input from a user of the client device, the new location of the client device if it is determined that the new location is different from the previous location of the client device received with the search query. The new location may be determined via a location-based system. The location-based system may include a global positioning system.

Updating the search result may include referencing the travel objective that includes instructions for processing the new location of the client device, the travel distance or the travel time determined based on the accessed user-defined information, and the point of interest received with the search query to identify at least one potential location based on a relationship between the potential location and the point of interest and based on a determination that the potential location and the new location of the client device are located within the travel distance or accessible within the travel time determined based on the accessed user-defined information and updating the search result by applying the travel objective to the new location of the client device. The at least one potential location may be associated with the point of interest received with the search query, and the at least one potential location may be located within the travel distance or accessible within the travel time, determined based on the accessed user-defined information, from the new location of the client device.

Updating the search result may include replacing the search result with a new search result including the at least one potential location that is associated with the point of interest and that is located within the travel distance or accessible within the travel time from the new location of the client device. Alternatively or additionally, updating the search result may include appending the search result with a new search result including the at least one potential location that is associated with the point of interest and that is located within the travel distance or accessible within the travel time from the new location of the client device. Alternatively or additionally, updating the search result may include deleting the search result that falls outside the determined travel distance or travel time from the new location of the client device.

The search query may include a user-entered keywords and detected location corresponding to the current location of the client device. Alternatively or additionally, the search query may include a user-entered keywords and a user entered location corresponding to the current location of the client device.

The point of interest may include an establishment associated with one or more locations. Alternatively or additionally, the point of interest may include a facility name. Alternatively or additionally, the point of interest may include an object in which a user of the client device is interested. The object may be associated with a particular activity.

Accessing the user-defined information may include accessing the user-defined information that relates to the travel distance and updating the search result may include updating the search result to include at least one potential location located within the travel distance from the new location of the client device if it is determined the new location of the client device differs by more than the threshold amount from the location received with the search query. Alternatively or additionally, accessing the user-defined information may include accessing the user-defined information that relates to the travel time and updating the search result may include updating the search result to include at least one potential location accessible within the travel time from the new location of the client device if it is determined the new location of the client device differs by more than the threshold amount from the location received with the search query. The method also may include receiving an indication of time at which the search result should be identified.

In another general aspect, a method for identifying a result responsive to a future location of a client device includes receiving, from a client device and at a host, a search query that includes a point of interest and a location corresponding to a current location of the client device, accessing user-defined information that relates to a travel distance or travel time, and determining the travel distance or the travel time based on the accessed user-defined information. The method also includes determining speed and direction of the travel of the client device, and predicting a first future location of the client device based on the speed, direction of travel, and the current location of the client device. The method further includes referencing a travel objective.

The travel objective includes instructions for processing the first future location of the client, the travel distance or the travel time determined based on the accessed user-defined information, and the point of interest received with the search query to identify at least one potential location based on a relationship between the potential location and the point of interest and based on a determination that the potential location and the first future location of the client device are located within the travel distance or accessible within the travel time determined based on the accessed user-defined information. The method also includes identifying a search result by applying the travel objective to the first future location of the client device.

The method also includes automatically receiving, from the client device, a new location of the client device as the location of the client device changes, comparing the new location to the location received with the search query to determine whether the new location of the client device differs by more than a threshold amount from the location received with the search query, and determining whether the new location of the client device differs by more than the threshold amount from the location received with the search query. If it is determined that the new location of the client device differs by more than the threshold amount from the location received in the search query, the method includes determining speed and direction of the travel of the client device, predicting a second future location of the client device based on the speed, direction of travel, and the new location of the client device, and updating the search result to include at least one potential location located within the travel distance or accessible within the travel time from the second future location of the client device.

Implementations of the above general aspect may include one or more of the following features. For example, the location corresponding to the current location of the client device may include an actual position of the client device. Alternatively or additionally, the location corresponding to the current location of the client device may include a location that is used as a surrogate for the current location of the client device. The location used as the surrogate may include a location of a base station or an access point that the client device uses for communication. The location of the base station or the access point may indicate a proximate current location of the client device. The base station may include a cellular base station and the client device may include a mobile phone.

Automatically receiving the new location of the client device may include automatically receiving, from the client device, the new location as a part of an updated search query as the location of the client device changes. Alternatively or additionally, automatically receiving the new location of the client device may include periodically receiving, from the client device, location information associated with the client device irrespective of whether the current location of the client device has changed. Alternatively or additionally, automatically receiving the new location may include receiving, from the client device and without an input from a user of the client device, the new location of the client device if it is determined that the new location is different from the previous location of the client device received with the search query. The new location may be determined via a location-based system. The location-based system may include a global positioning system.

Updating the search result may include referencing the travel objective that includes instructions for processing the second future location of the client device, the travel distance or the travel time determined based on the accessed user-defined information, and the point of interest received with the search query to identify at least one potential location based on a relationship between the potential location and the point of interest and based on a determination that the potential location and the second future location of the client device are located within the travel distance or accessible within the travel time determined based on the accessed user-defined information and updating the search result by applying the travel objective to the new location of the client device. The at least one potential location may be associated with the point of interest received with the search query, and the at least one potential location may be located within the travel distance or may be accessible within the travel time, determined based on the accessed user-defined information, from the second future location of the client device.

In one implementation, updating the search result may include replacing the search result with a new search result including the at least one potential location that is associated with the point of interest and that is located within the travel distance or is accessible within the travel time from the second future location of the client device. Alternatively or additionally, updating the search result may include appending the search result with a new search result including the at least one potential location that is associated with the point of interest and that is located within the travel distance or is accessible within the travel time from the second future location of the client device. Alternatively or additionally, updating the search result may include deleting the search result that falls outside the determined travel distance or travel time from the second future location of the client device.

The search query may include a user-entered keywords and detected location corresponding to the current location of the client device. Alternatively or additionally, the search query may include a user-entered keywords and a user entered location corresponding to the current location of the client device.

The point of interest may include an establishment associated with one or more locations. Alternatively or additionally, the point of interest may include a facility name. Alternatively or additionally, the point of interest may include an object in which a user of the client device is interested. The object may be associated with a particular activity.

Accessing the user-defined information may include accessing the user-defined information that relates to the travel distance and updating the search result may include updating the search result to include at least one potential location located within the travel distance from the new location of the client device. Alternatively or additionally, accessing the user-defined information may include accessing the user-defined information that relates to the travel time and updating the search result may include updating the search result to include at least one potential location accessible within the travel time from the new location of the client device.

The method also may include receiving an indication of time at which the search result should be identified.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

Figure 1:
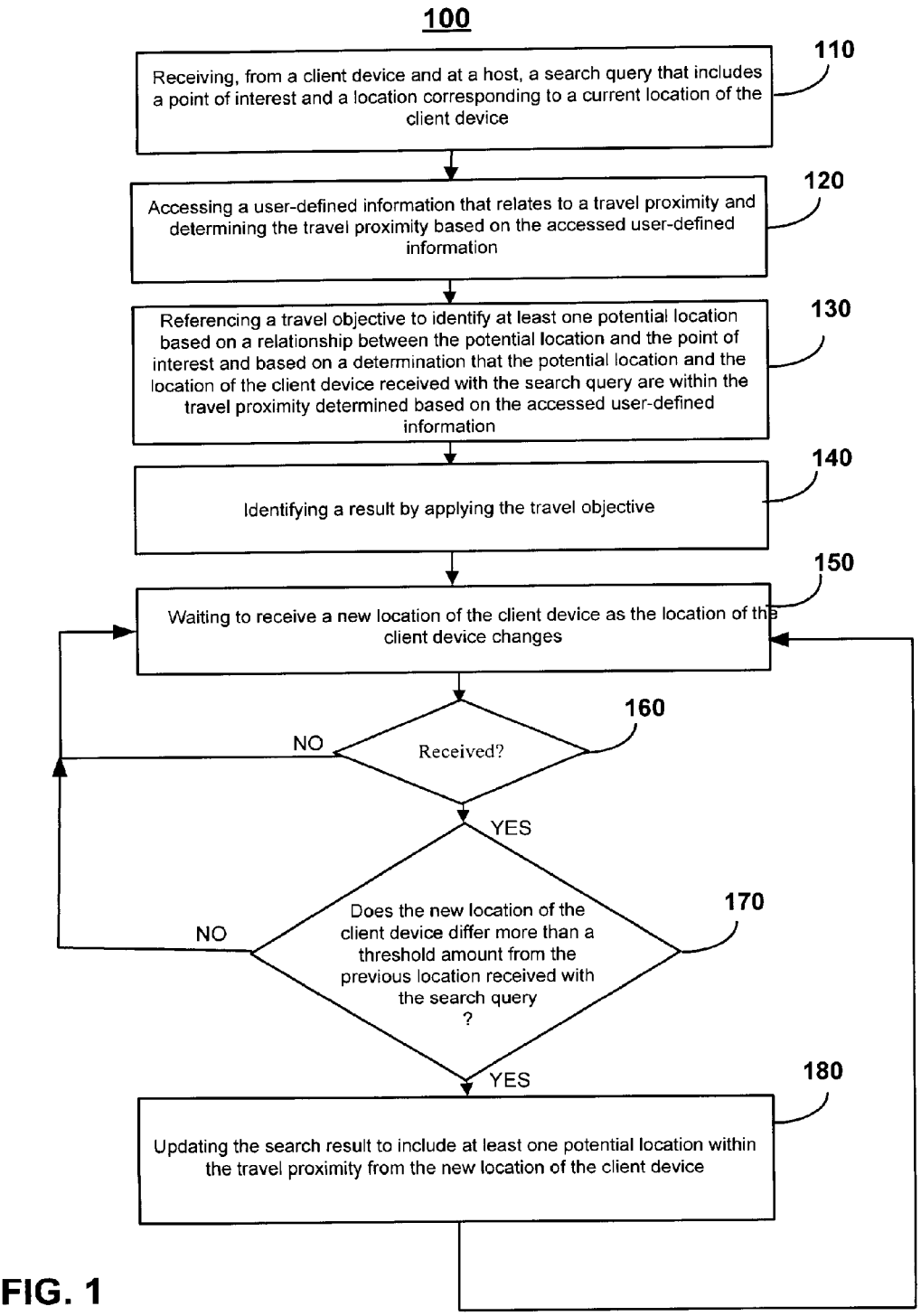
FIG. 1 illustrates an exemplary process used by a hosted service to identify a result within a user-defined proximity from a current location of a client device operated by the user.

In one implementation, a system is configured to provide a user with access to a geographically constrained search result. A user of a client device submits to a host a search query that includes a current location of the client device and a point of interest. The point of interest may be associated with an establishment having one or more locations associated therewith. In response, the host provides a result that includes a potential location for the point of interest and is within a defined proximity from the current location of the client device. Thereafter, as the client device moves, the current location is detected and compared to the location submitted as part of the previous search query. If more than a threshold difference exists between the current location of the client device and the previously submitted location, the search query is resubmitted with an updated current location. The host receives the search query and identifies the current location has changed, and, in response, the host identifies a new search result that is within the defined proximity from the current location of the client device. In this manner, the host identifies a geographically constraint search result. As such, the user of the client device may be presented with proximate results to the current location irrespective of whether the client device is stationary or is moving.

In one example, the user may be operating a vehicle while searching for information. For example, the user may be searching for an apartment or a house. The user may submit a search query and a travel objective to a host. The search query may include one or more criteria associated with the apartment or the house. The one or more criteria may include, for example, a price range and/or a number of bedrooms. The search query also may include location data associated with a current location of the client device. The location data submitted as part of the search query may be updated to reflect the current location of the client device if the current location changes.

The travel objective may include a user-defined objective to which the result should be responsive. The user-defined objective may include instructions for identifying a result that is located within a user-defined proximity of the current location of the client device. After receiving the search query and the travel objective, the host may search for and identify a result that is responsive to the search query and the travel objective. Thus, the host may identify one or more apartments or houses that are responsive to the search query and are within the user-defined proximity of the current location of the client device. As the search query may be automatically updated with a changing current location, the result identified by the host also may be updated. For example, as the user travels a result list may be updated to identify results based on a current location of the traveling user. The host may determine that a result location is no longer within the user-defined proximity, and the host may remove the result associated with the result location from a result list presented to the user.

An exemplary process 100 of FIG. 1 may be used by a hosted service to identify a result within a user-defined proximity of a current location of a client device operated by a user. Below, process 100 is described with a brief reference to other illustrative figures, each of which is later described separately.

Process 100 begins with a host receiving, from a client device, a search query that includes a point of interest and a location corresponding to a current location of the client device (110). The host may receive the search query via a user interface ("UI"), such as, for example, UI 200 shown in FIG. 2. The UI 200 may be displayed, for example, on an in-vehicle navigation system, a mobile device, such as a cellular phone or a personal digital assistant ("PDA"), or other devices, such as personal computer.

The search query includes the point of interest. The point of interest may be entered manually and defined by a user-entered keywords or terms. Alternatively or additionally, the point of interest may be defined via selection(s) of one or more options within a UI, such as for example, the UI 200. The point of interest may represent an establishment associated with one or more locations. Alternatively or additionally, the point of interest may include a facility name.

The search query also includes the current location of the client device. The client location of the client device, similar to the search query, may be either entered manually and defined by a user-entered keywords or defined via selection of one or more options within a UI, such as for example, the UI 200. The current location of the client device may include an actual position of the client device. Alternatively or additionally, the current location of the client device may include a location used as a surrogate for the current location of the client device. The location used as the surrogate may include a location of a base station or an access point that the client device use to communicate with others. And, the location of the base station or the access point indicates a proximate current location of the client device. In one specific example, the base station includes a cellular base station and the client device includes a mobile phone.

In response to receiving the search query, the host accesses user-defined information that relates to a travel proximity and determines the travel proximity based on the accessed user-defined information (120). The travel proximity may include a travel distance or travel time. In one implementation, the user-defined information may be part of is a travel objective. The travel objective may be included in the search query and may be submitted to the host as part of the search query. In particular and referring to UI 200, the search query includes the travel objective portions, allowing the user to define the travel objective. In a slightly different implementation, the travel objective may be a default objective stored in a memory at the host and may not be submitted as part of the search query unless the user wishes to update the default setting, in which case the user submits a new travel objective to the host. In yet another example, the user may submit the search query and the travel objective separately to the host.

The travel objective includes instructions for identifying a potential location associated with the point of interest included in the search query, such that the potential location is within the travel proximity of the current location of the client device. The host references the travel objective to identify at least one potential location based on a relationship between the potential location and point of interest and based on a determination that the potential location and the location of the client device received with the search query are within the travel proximity determined based on the accessed user-defined information (130). To this end, the travel objective instructs the host to process the location of the client device received with the search query, the travel proximity (e.g., the travel distance or travel time) determined based on the accessed user-defined information, and the point of interest included in the search query to identify the at least one potential location associated with the point of interest.

Figure 3:
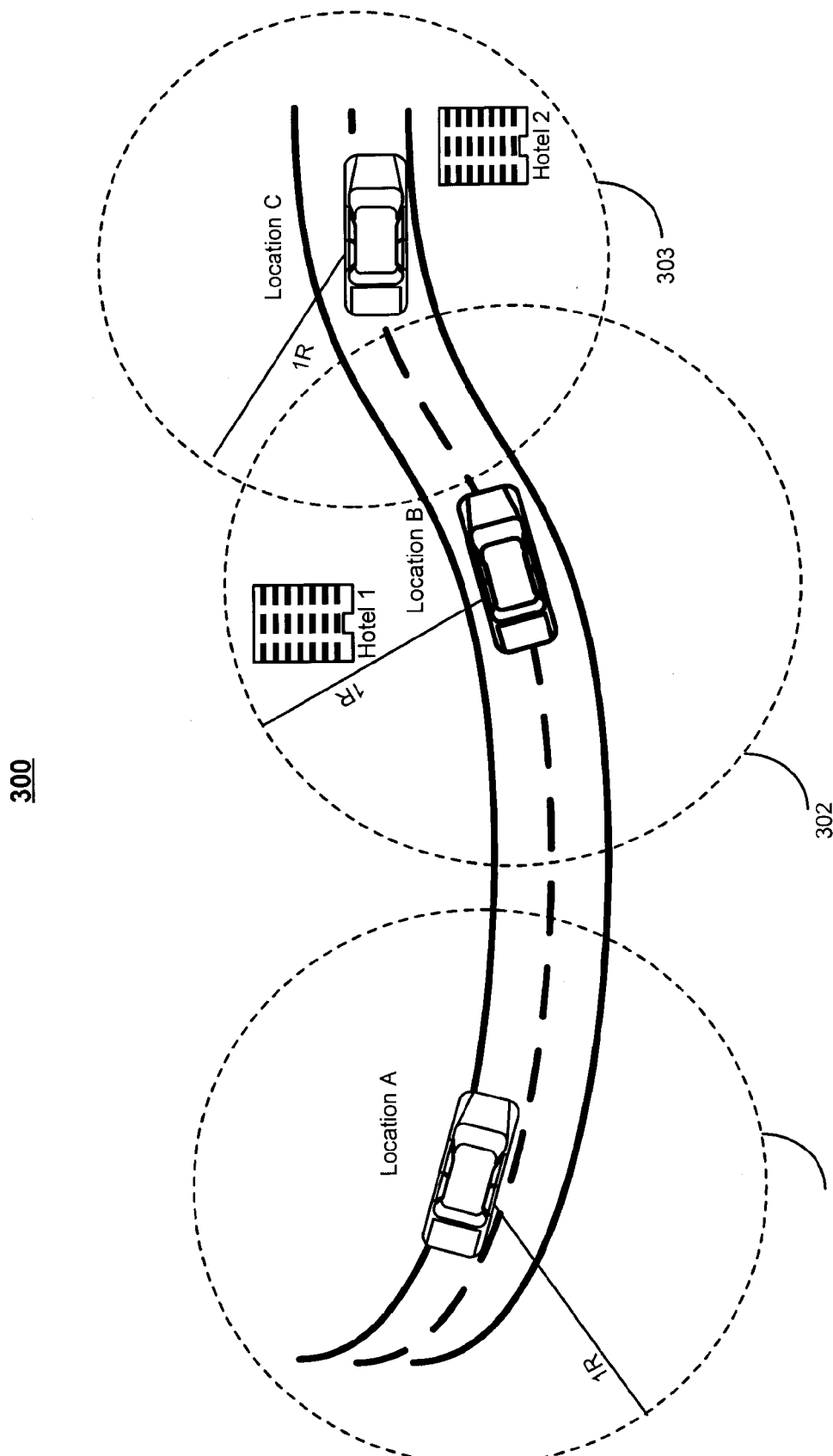
FIG. 3 illustrates a user of a client device operating a vehicle and searching for a hotel having a room for under $50 per night that is within 1 mile of a current location of the client device.

By applying the instructions, the host identifies the at least one potential location (140). To do so, in one implementation, the host identifies a boundary around the current location of the client device and searches within that boundary for a potential location associated with the point of interest. As shown in FIG. 3, the boundary may be a circular boundary, centered at the current location of the client device and having a radius approximately equal to the travel proximity.

After identifying a result or lake thereof, the host presents the results to the user and the host waits until it receives a new location of a client device as the location of the client device changes (150). In a decision block (160), the host checks to determine whether the new location has been received. If not (160, no), the host continues to wait for the new location of the client device and/or instructions from the client device to halt the process. Upon receiving the new location of the client device (160, yes), the host determines whether the new location of the client device differ by more than a threshold amount from the previous location received with the search query (170). If the new location of the client device differs from the previous location received with the search query more than the threshold amount (170, yes), the host updates the search result to include at least one potential location for the point of interest included in the search query, such that the potential location is located within the travel proximity (e.g., the travel distance or travel time) from the new location of the client device (180).

To update the search result, the host again may reference the travel objective, which instructs the host to process the new location of the client device, the travel proximity determined based on the accessed user-defined information, and the point of interest included in the search query. By following the instructions, the host identifies the at least one potential location based on a relationship between the potential location and the point of interest and based on a determination that the potential location and the new location of the client device are within the travel proximity determined based on the accessed user-defined information.

In one implementation, as a part of updating the search query, the host replaces the previously identified search result with a new search result that includes the at least one location associated with the point of interest and located within the travel proximity from the new location of the client device. Alternatively, as a part of updating the search query, the host appends the previously identified search result with the new search result. Alternatively, as a part of updating the search result, the host only displays results that are within the travel proximity from the current location of the client device. As such, as the previously identified results move outside of the travel proximity (e.g., the travel distance or travel time) from the current location of the client device, the host deletes them from the search folder and/or the search list.

In a slightly modified scenario, process 100 may be modified, such that the client device performs the action (170) instead of the host. In particular, in this implementation, the client device automatically resubmits the search query when the new location differs by more than a threshold amount from the previously submitted location. In yet another example, the host may abstain from the threshold check and may proceed to perform action (180) regardless of whether the change in the client device's location is greater than the threshold amount. That is the host proceeds with the remaining action in process 100 as long as it is determined that the new location is different from the previously submitted location regardless of the amount of change in the location.

The host continues the actions performed in operational blocks (150, 160, 170, and 180) until a desired location for the point of interest is identified or the client device otherwise instructs the host to halt the process.

Figure 2:
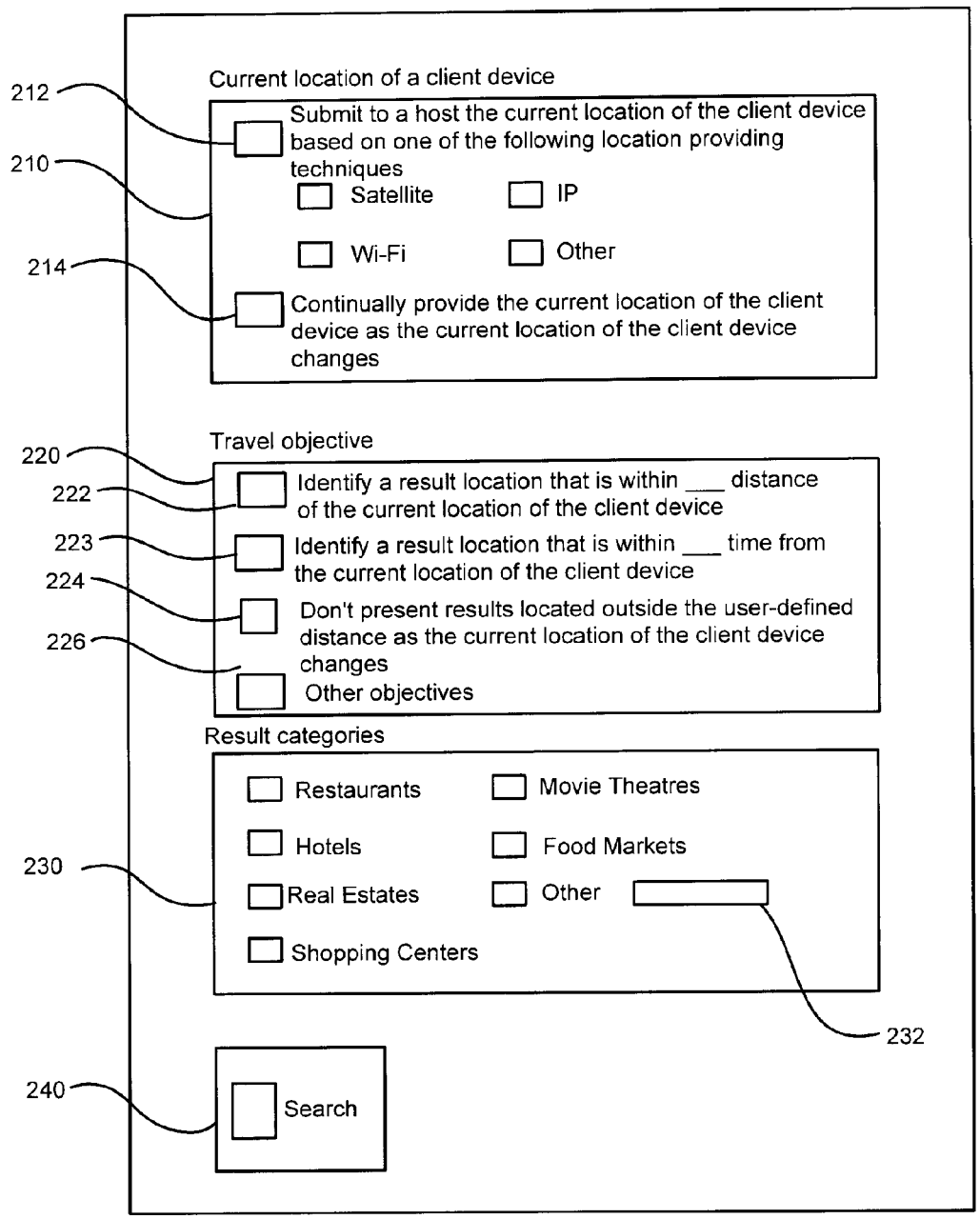
FIG. 2 illustrates an exemplary user interface that may be presented to a user of a client device searching for a particular service or location.

The exemplary UI 200 of FIG. 2 may be used to allow a user to continuously submit to a host a search query that includes location data associated with a current location of a client device. In particular, the user interface 200 includes a feature, allowing the client device to automatically update the search query as the current location of the client device changes. As the current location of the client device changes, the result identified by the host may be updated to be responsive to the current location. As shown, the user interface 200 includes a current location selection portion 210, a travel objective selection portion 220, a result selection portion 230, and a search selection portion 240. The current location selection portion 210 includes a current location option 212 and an update indicator 214. The current location option 212 allows the user to submit the current location of the client device. In particular, to submit the current location, the user may select the current location option 212 and specify one or more location providing components to be used in providing the current location. The components may include a satellite system such as a global positioning system ("GPS"), a global Internet protocol ("IP") address, wireless network correlation techniques, and/or "other" techniques such as TV tower, cell tower, and/or radio frequency signal patterns of a client device. In one example, the current location of the client device, such as a mobile device, may be determined via a GPS module. The mobile device may provide the current location to the host if the user selects the current location option 212 and the satellite option as the location providing component.

Alternatively, the current location may be determined by registering the client device with a host (e.g., a Session Initiation Protocol ("SIP")) server. The client device may provide information to the host that is used to derive location information. For example, the host may derive location information based on how the client device is accessing the network (e.g., as identified by source IP address or another packet identifier). Alternatively, the current location of the client device may be determined using wireless network correlation techniques. For example, the current location may be determined via a base station or an access point that the client device is using to communicate with others. The location of the base station or the access point indicates the proximate current location of the client device.

The update indicator 214 enables the user to automatically provide the host with the current location of the client device as the current location changes. For example, the current location of the client device may be periodically submitted with a search query irrespective of whether the current location of the client device has changed. Alternatively, the current location of the client device may be updated when the current location actually changes. If the current location of the client device has changed, the search query may be updated to reflect the current location. In yet another example, the current location of the client device may only be submitted if it differs by more than a threshold amount from the previously submitted location. The threshold may be defined by the user and/or the host.

The user interface 200 also includes the travel objective selection portion 220. The travel objective selection portion 220 enables the user to identify a result that is within a travel proximity of the current location of the client device. In one example and as shown in FIG. 2, the travel proximity may include a user-defined distance. Alternatively, the travel proximity may include travel time. The travel objective selection portion 220 includes a distance portion 222, time portion 223, a remove portion 224, and "other" objective portion 226. The distance portion 222 enables the user to specify a distance proximity to the current location of the client device. For example, upon selection of the distance portion 222 and specifying the proximity, the host may identify and present to the user one or more results that are responsive to the search query and are within the user-defined distance proximity. Similarly, the time portion 223 enables the user to specify a time proximity to the current location of the client device. For example, upon selection of the time proximity 223 and specifying the proximity, the host identifies and displays to the user one or more results that are within the user-specified time proximity to the current location of the client device. Because the current location may change as the user travels, some of the results may no longer be responsive to the specified proximity. Thus, the remove portion 224 allows the user to instruct the host to remove the results that are no longer within the user-defined proximity of the current location of the client device changes.

For example, if the user instructs the host to identify a result located within 2 miles of the current location, the host may identify and present a result located within 2 miles of the current location of the client device. If the client device moves, results no longer within the 2 miles proximity may be removed from a result list presented to the user. Similarly, the new results that were previously outside of the 2 miles proximity and are now within the 2 miles proximity may be added to the result list presented to the user.

The "other" objective portion 226 enables the user to specify alternative or additional objectives for use in identifying the result. In one example, the alternative or the additional objective may include taking into consideration traffic conditions when determining a result within a user-specified time from the current location of the client device.

The user interface 200 also includes the result selection portion 230. The result selection portion 230 enables the user to select one or more result categories. As shown, the result categories include restaurants, hotels, real estates, shopping centers, movie theaters, food markets, and "other" categories. The result categories may have associated sub-categories, such that when the user selects one of the result categories, the user is enabled to specify one or more criteria for use in identifying the result. In one example, if the user is searching for a particular hotel, the user may select the hotel category from the result selection portion 230. Upon selecting the hotel category, the user may be presented with another user interface enabling the user to specify one or more criteria associate with the hotel category. The criteria may include a price under $50, as described in more detail with respect to FIG. 3. If the user is searching for a particular service or location that is not shown, the user may specify the result in an "other" category field 232.

The user may activate the search selection portion 240 after specifying parameters in the user interface 200. In response to receiving the search query, the host identifies a result. The host may then enable the user to access the result.

FIG. 3 illustrates an exemplary topological configuration 300 with a user traveling on route 295 from Washington D.C. to Baltimore and searching for a hotel that costs under $50 per night and that is located within 1 mile from the current location of the client device. In one example, the client device includes a vehicle that includes a navigation system. In another example, the client device may include a mobile device such as a cellular phone, which may include a navigation application.

The user starts the user's trip at location A and provides the host with a search query. In one example, using the navigation system operated in the vehicle, the user accesses an exemplary UI, such as the UI 200 to specify and submit the search query to the host. The search query includes the point of interest and the current location of the client device. The point of interest includes a hotel, offering a room for under $50 per night. The current location (e.g., the location A) corresponds to the actual position of the client device and may be entered either manually by the user or automatically by one or more location-based systems, such as, for example, a GPS system.

In response to receiving the search query, the host accesses user-defined information that relates to a travel proximity, and the host determines the travel proximity based on the accessed user-defined information. In keeping with the previous example, the travel proximity includes a travel distance of 1 mile from the current location of the client device. The user-defined information may be part of a travel objective that also may be received at the host with the search query. In particular and referring to the UI 200, the search query includes the travel objective portions, allowing the user to define the travel objective. The travel objective includes instructions for identifying how far a potential location for hotel should be from the current location of the client device. For example, as shown in FIG. 3, configuration 300 may specify the result should be within 1 mile of the current location.

In response to receiving the user selection(s), the host references the travel objective to identify a hotel location that is within 1 mile from the current location of the client device and offers a room for under $50 per night. In particular, the host applies the travel objective to the current location to identify a search boundary that includes a circular shape, which the host would in turn use to search for a hotel offering a room for under $50 per night. In one example, the circular boundary is centered at the current location of the client device and includes a radius of 1 mile.

To illustrates and referring to FIG. 3, when the client device is at location A, the host generates a circular boundary 301 and searches within the circular boundary 301 for a potential location associated with the point of interest. The circular boundary is centered at the current location of the client device (e.g., location A) and includes a radius of 1 mile. After conducting the search, the host determines that there are no hotels, offering a room for under $50 per night, within 1 mile of the client device's current location (e.g., location A).

As the user travels from location A to location B, the host waits to receive a new location of the client device. In one implementation, the update indicator 214 in the UI 200, allows the user to automatically provide the host with the new location of the client device as the location of the client device changes. For example, the location of the client device may be periodically submitted to the host irrespective of whether the location of the client device has actually changed. Alternatively, the location of the client device may be updated when the location actually changes. For instance, if the current location of the client device changes, the client device detects the change and submits the new location of the client device to the host. In either case, the host receives the new location (e.g., location B) and determines whether the new location differ by more than a threshold amount from the previous location received with the search query (e.g., location A). The threshold may be defined by the user and/or the host.

Upon determination that the new location (e.g. location B) differs by more than the threshold amount from the previous location A, the host generates a circular search boundary 302. The circular search boundary 302 is centered at the new location (e.g., location B) and includes a radius of 1 mile. The host uses the circular search boundary 302 to search for a hotel, offering a room for under $50 per night. As a result of the search, the host identifies, within the circular search boundary 302, a first hotel (e.g., hotel 1) that includes a room for under $50 per night, and the host presents the search result to the user.

As the user travels from location B to location C, the client device continues to provide the host with the new location of the client device. The host receives the new location of the client device and checks to determine whether the new location differ by more than the threshold amount from the previously submitted location B. When the client device is at the new location C, the host determines that the new location does differ by more than the threshold amount from the previously submitted location (e.g., location B). Upon such determination, the host generates a circular search boundary 303, and the host searches within the circular search boundary 303 to identify a potential location for the hotel. The circular search boundary 303 is centered at location C and similar to the circular search boundaries 301 and 302 includes a radius of 1 mile. As a result of searching within the boundary 303, the host identifies a second hotel, offering a room for under $50 per night, and located within 1 mile of the current location of the client device.

The host updates the search result to include the second hotel location. In one implementation, as a part of the updating the search result, the host only displays results that are within the user-defined proximity from the current location of the client device. As such, as the previously identified result (e.g., the first hotel) move outside of the travel distance (e.g., the 1 mile radius) from the current location of the client device, the host deletes the search result from the search folder and/or the search list.

Based on a processing delay associated with identifying a result responsive to the search query and also based on the user's travel speed, by the time the identified result is presented to the user, the user may no longer be within the proximity of the identified result. To remedy this concern, in one implementation, the host is configured to identify a future location of the client device within a certain amount of time and identifies a result within the proximity of the future location. As such, by the time the result is presented to the user, the user is likely to be at the future location and the result will be within the proximity of the user. This implementation is described in more detail below with respect to FIG. 4.

Figure 4:
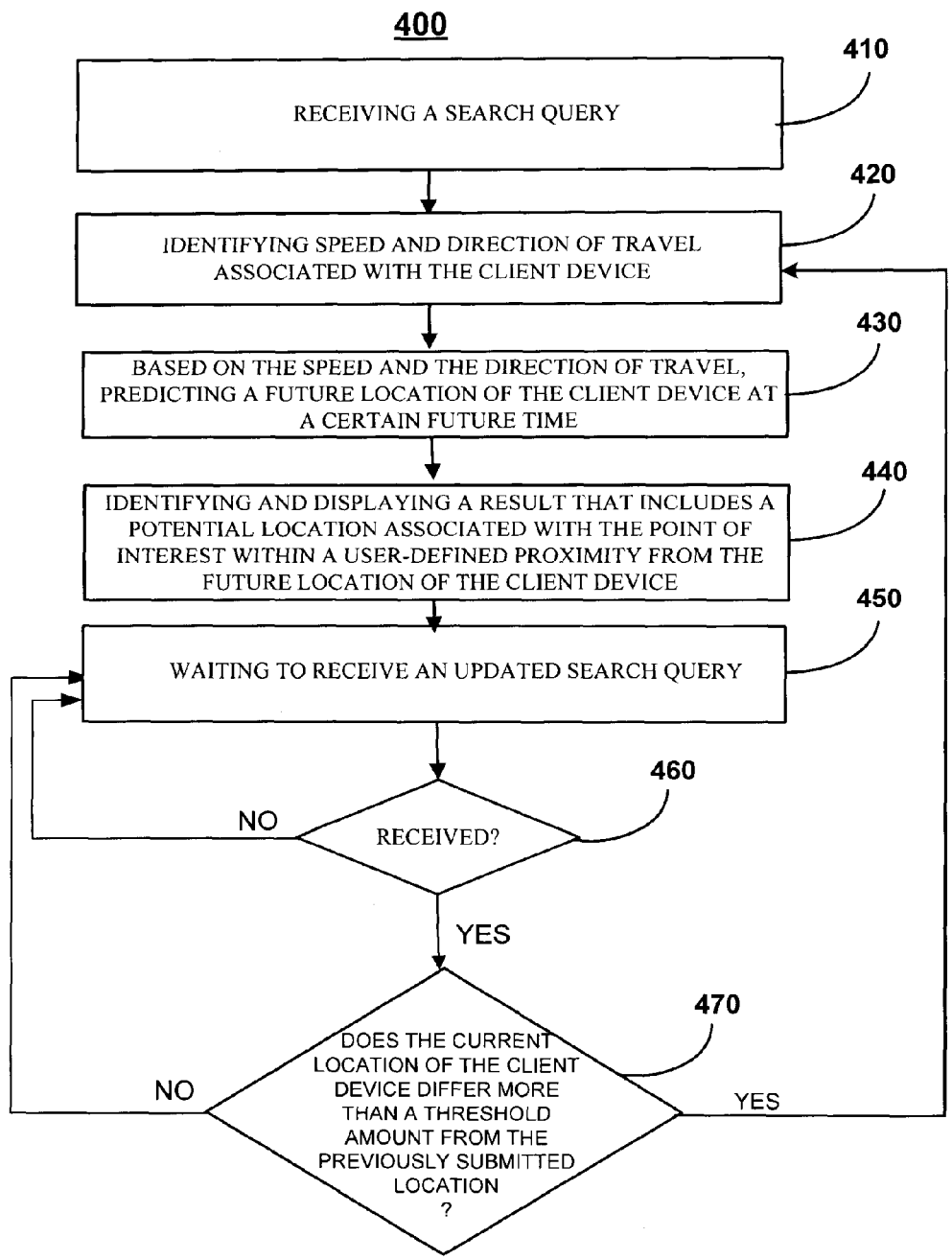
FIG. 4 illustrates another exemplary process used by a hosted service to identify a result within a user-defined proximity from a current location of a client device operated by the user.

FIG. 4 illustrates an exemplary process 400 used by hosted service to identify to identify a result within a user-defined proximity from the future location of the client device. Process 400 begins with the host receiving a search query (410). The search query may be submitted via the UI 200 of FIG. 2, for example, and the search query may include the current location of the client device, a point of interest, and a travel objective. The travel objective may include instructions for identifying a potential location associated with the point of interest, such that the potential location is within a certain amount of time and/or distance from the current location of the client device.

The host also identifies the speed and the direction of travel associated with the client device (420). To this end and in one implementation, the client device may be equipped with a navigation system that submits to the host the speed and direction of travel associated with the client device. For example, the navigation system may have previously received from the user of the client device the addresses associated with the starting location and the ending location and may have mapped the direction of travel for the user. In another implementation, the client device continuously submits location data to the host and the host uses the location data to derive and/or anticipate the direction of travel. In one specific example, the location data may include radio frequency signals transmitted from a mobile device (e.g., a cellular phone). In particular, the mobile device transmits radio frequency signals, which are received at the host. The received radio frequency signals may include different patterns as they bounce around different infrastructures before reaching the host. The host identifies the frequency patterns and matches and/or associates those patterns with previously stored frequency pattern having a particular location associated therewith. In this manner, the host derives the current location of the traveling mobile device. The host may then reference a map to determine the road associated with the current location and thus identifying the direction of travel.

Based on the speed and direction of travel, the host predicts a future location of the client device at a certain future time (430). For instance, the host may predict the future location of the client device in 5 minutes from the present time. To do so, the host may first identify a travel distance ("X") by multiplying the velocity ("V") of the client device with the time ("T") as shown in equation 1 and then may add the travel distance to the current position of the client device to identify a future location of the client device as shown in equation 2.

$$X = V*T \quad \text{(Equation 1)}$$

$$X_{future} = X_{present} + X \quad \text{(Equation 2)}$$

Upon predicting the future location, the host identifies and displays a result that includes a potential location associated with the point of interest within a user-defined proximity from the future location of the client device (440). To do so, the host may perform the same actions performed in operational block (130) of process 100. The host then waits to receive an updated search query (450) and uses the operational block (460) to determine whether the search query has been updated. If not, the host continues actions within the operational blocks (450 and 460) until the host receives an updated search query or otherwise instructions from the user to halt the process. If the host does receive an updated search query, then the host determines whether the current location of the client device differ by more than a threshold amount from the previously submitted location (470). If so, the host continues actions (420, 430, 440, and 450) until a desired result is found or the host is instructed to halt the process.

In a slightly modified scenario, in addition to identifying the future location of the client device, the host may also determine one or more intermediary locations between the future location and the current location of the client device. The host may then form a boundary that includes these location and search for a potential location associated with the point of interest within the identified boundary. In one example, the boundary may include an elliptical shape.

Other implementations are within the scope of the following claims. For example, a user interface may be configured to enable the user to automatically provide and update the current location of the client device to the host without requiring a user to select options in a current location selection portion. The user also may override an "automatic mode determination" and provide the current location of the client device manually or via, for example, selecting the options in the current location selection portion 110.

In another example, a user interface may be configured to accept a time and date during which the search should be performed. In particular, the user interface may include a time and date field to enable the user to specify a particular time and date on which the search should be performed. To keep with a previous example, a business traveler who frequently travels during weekdays may specify a search for a hotel to be performed Monday through Friday between 6 to 8 pm. In this manner, the traveler only needs to specify these parameters once and thereon, the host automatically searches for a desired hotel on the specified day and time. In addition, in this manner the system may be configured to search for different points of interest depending on a particular time of day.

The host may be configured to add additional results to the result list if new results that are responsive to the search query and the travel objective are identified. However, the host may be configured to preserve previously identified results (in one instance). More particularly, the host may be configured to preserve the results that were previously within the user-defined proximity of the current location of the client device, but, due to a change in the current location, are no longer within that proximity.

In another implementation, the host may be configured to prioritize the results. For example, the results may be sequentially presented in the result list in order of their proximity to the current location of the client device. The result that is closest in time or distance from the current location may be presented first, and the result that is furthest in time or distance from the current location may be presented last. If the results are presented in the map, the results may be prioritized as the results are presented. For example, the result that is closest in time or distance from the current location may be "highlighted" and the result that is furthest in time or distance from the current location may be "faded."

In another implementation, as the current location of the client device changes, the result identified by the host may be updated. As part of updating the results, the information regarding the travel time or the travel distance to the result location also may be updated to be responsive to the current location of the client device.

In another implementation, the travel objective may be identified by the host. For example, the host may identify a result that is within a host-identified proximity (e.g., time or distance) of the current location of the client device. The host may use the frequency at which the current location changes to determine how fast the user is traveling. Based on the speed of the traveling user, the host may identify a result. For example, the host may determine the user is walking if the user is traveling 1 mile per hour; therefore, the host may identify results that are within walking distance to the user. In another example, the host may determine the user is driving if the user is traveling 70 miles per hour; therefore, the host may identify results that are within driving distance to the user. In another implementation, the user may be enabled to specify one or more travel objectives as default objectives so that, in a subsequent attempt to identify a particular service or location, the user may not need to provide the host with the travel objective.

In another implementation, the user may be searching for a particular service or location that is moving. The particular service may be a mobile ice cream truck. To identify if the ice cream truck is within a user-defined proximity of the current location of the client device, the host determines the current location of the ice cream truck. The host may determine the current location of the ice cream truck via GPS, global IP address, wireless network correlation techniques, and/or "other" techniques, such as TV tower, cell tower, and/or radio frequency signal patterns to derive location.

Other implementations are within the scope of the following claims.

What is claimed is:

1. A method comprising:
   determining, by a mobile device based on information received via a network, a first location corresponding to a current location of the mobile device, wherein the first location is located along a travel route for the mobile device with a path between an originating point and a destination;
   identifying, by the mobile device, a first set of search results from a first search request based on the first location, wherein:
   the first set of search results comprises a first result and a second result,
   the first result is within a travel proximity of the first location, and
   the second result is within the travel proximity of the first location;
   providing, by the mobile device, a display of search results on a graphical user interface of the mobile device to a user of the mobile device, the display of the search results including the first result and the second result;
   determining, by the mobile device, a second location corresponding to an updated current location of the mobile device, wherein determining the second location comprises detecting the second location is different than the first location regardless of an amount of change between the first location and the second location, wherein the determining the second location corresponding to the updated current location of the mobile device comprises determining the second location in response to identifying that a threshold period of time has elapsed;
   generating, by the mobile device, a second search request based on determining the second location is different than the first location and regardless of the amount of change between the first location and the second location;
   identifying, by the mobile device and in response to the second search request based on the second location, a second set of search results that is different than the first set of search results, wherein: the second set of search results comprises the second result and a third result, the second result is within a travel proximity of the second location, and the third result is within the travel proximity of the second location;
   deleting, by the mobile device, the first result from the display of search results; and
   appending, by the mobile device, the third result to the display of search results on the graphical user interface of the mobile device.

2. The method of claim 1 wherein the first result includes a category that the user can select to retrieve additional results.

3. The method of claim 1 further comprising identifying a cost threshold that is used to identify the first result and the second result.

4. The method of claim 1 further comprising identifying a travel proximity that specifies a distance from the travel route that the user is willing to travel.

5. The method of claim 4 wherein identifying the travel proximity further comprises accounting for a speed and a direction of the mobile device.

6. The method of claim 1 wherein identifying the second set of search results comprises ignoring the first result based on the first result being located greater than the travel proximity from the updated current location of the mobile device.

7. The method of claim 1 further comprising receiving a search query from the user, wherein the search query relates to a point of interest.

8. The method of claim 1 wherein the first set of search results comprises locations of points of interest.

9. The method of claim 1, further comprising:
   receiving a search query from the user that specifies a category of interest to the user; and
   generating the first search request to include the search query from the user.

10. The method of claim 1, wherein the first set of search results does not include the third result, and the second set of search results does not include the first result.

11. The method of claim 1, wherein identifying a second set of search results that is different than the first set of search results is further based on the second set of search results being within a travel time threshold of the second location.

12. The method of claim 1, wherein deleting the first result from the display of search results, and appending the third result to the display of search results is performed without user intervention.

13. The method of claim 1, further comprising reordering the display of search results based on a comparison of distances of the second result to the second location of the mobile device and the third result to the second location of the mobile device.

14. A computer system comprising: at least one processor; and
   one or more non-transitory computer readable storage media having stored thereon computer-executable instructions that, when executed by the at least one processor, cause the computer system to:
   determine, based on information received via a network, a first location corresponding to a current location of a mobile device, wherein the first location is located along a travel route for the mobile device with a path between an originating point and a destination;
   identify a first set of search results from a first search request based on the first location, wherein:
   the first set of search results comprises a first result and a second result,
   the first result is within a travel proximity of the first location, and
   the second result is within the travel proximity of the first location;
   provide a display of search results on a graphical user interface of the mobile device to a user of the mobile device, the display of search results including the first result and the second result;
   determine a second location corresponding to an updated current location of the mobile device, wherein determining the second location comprises detecting the second location is different than the first location regardless of the amount of change between the first location and the second location, wherein the determining the second location corresponding to the updated current location of the mobile device comprises determining the second location in response to identifying that a threshold period of time has elapsed;

generate a second search request based on determining the second location is different than the first location and regardless of an amount of change between the first location and the second location;

identify, from the second search request based on the second location, a second set of search results that is different than the first set of search results, wherein:
  the second set of search results comprises the second result and a third result,
  the second result is within a travel proximity of the second location, and
  the third result is within the travel proximity of the second location;

delete the first result from the display of search results; and append the third result to the display of search results on the graphical user interface of the mobile device.

15. The computer system of claim 14 wherein the first result includes a category that the user can select to retrieve additional results.

16. The computer of claim 14 further comprising instructions that, when executed by the at least one processor, cause the computer system to identify a cost threshold that is used to identify the first result and the second result.

17. The computer system of claim 14 further comprising instructions that, when executed by the at least one processor, cause the computer system to identify a travel proximity that specifies a distance from a travel route that the user is willing to travel.

18. The computer system of claim 17 wherein identifying the travel proximity further comprises accounting for a speed and a direction of the mobile device.

19. The computer system of claim 14 wherein identifying the second set of search results comprises ignoring the first result based on the first result being located greater than the travel proximity from the updated current location of the mobile device.

20. The computer system of claim 14 further comprising instructions that, when executed by the at least one processor, cause the computer system to receive a search query from the user, wherein the search query relates to a point of interest.

21. The computer system of claim 14 wherein the first set of search results comprises locations of points of interest.

* * * * *